United States Patent Office 3,089,673
Patented May 14, 1963

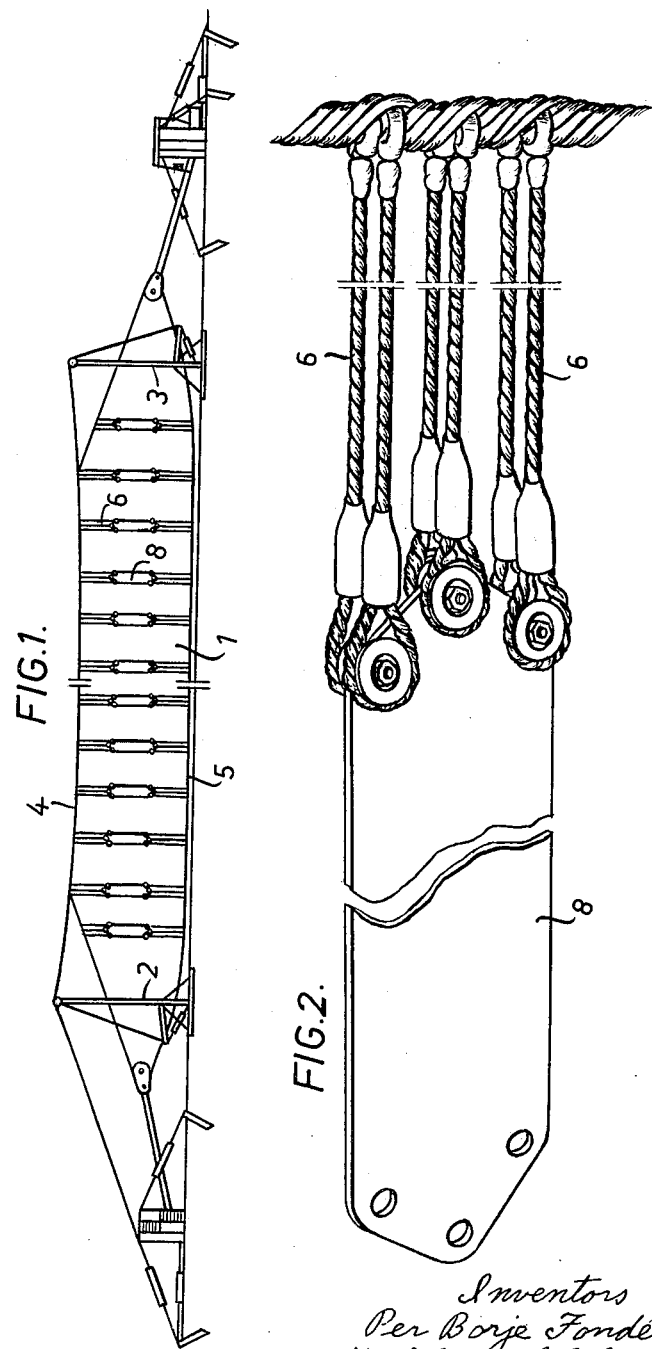

3,089,673
AIRPLANE ARRESTING NETS
Per Börje Fondén, Gotgatan 23, and Karl Ove Torgny Wålander, Vasavagen 49, both of Linkoping, Sweden
Filed Apr. 6, 1960, Ser. No. 20,410
1 Claim. (Cl. 244—110)

The present invention relates to airplane runaway-preventing apparatus of the kind comprising an arresting net including two substantially horizontal supporting wires spaced from each other vertically and a plurality of vertically extending ropes interconnecting said wires, the net being suitably suspended from between masts preferably so adapted that they may be raised and lowered. The airplane is caught and stabilized by said net which is adapted primarily to retain the wings of the airplane. Certain modern airplanes having wings with rather sharp leading edges or leading edges with sharp portions, however, cannot be caught by hitherto known nets because the vertical ropes will be cut when sliding along such sharp leading edges or edge portions of the wings. The present invention has for its object to avoid this drawback and is characterized, chiefly, by the fact that the vertical ropes forming part of the net are made of a highly extensible material resistant to severing forces, such as, for instance, stainless steel.

The invention is illustrated by way of example in the accompanying drawing, in which:

FIG. 1 is an elevation of the net in its raised or expanded position; FIG. 2 shows a portion of a vertical rope.

Referring to FIGS. 1 and 2 of the drawings, the arresting net 1 is suspended from between a pair of masts 2 and 3 which can be raised and lowered. Reference numerals 4 and 5 designate the two substantially horizontally extending supporting wires of the net. Said wires are interconnected by a plurality of substantially vertically extending ropes 6 made of nylon or a similar material. Said vertical ropes 6, as shown in FIG. 2, include within the net areas where they may be expected to be engaged by the wings of an onrushing airplane each protection against severing forces comprising a strip 8 of stainless steel or a material having similar properties as stainless steel (that is, a good flexibility, a high extensibility and a high resistance to corrosion).

We claim:

An airplane runaway-preventing device of the type comprising an arresting net, a pair of masts for holding said net suspended between themselves, and in which said net comprises substantially horizontal upper and lower wires and substantially vertical connecting members extending individually therebetween so as to leave parallel spaces between themselves extending uninterruptedly between said upper and lower wires, each such vertical connecting member comprising upper and lower end portions of rope material and an individual middle portion consisting of a bendable flat strip of stainless steel.

References Cited in the file of this patent

UNITED STATES PATENTS

| | | |
|---|---|---|
| 986,269 | Cowell | Mar. 7, 1911 |
| 1,648,383 | Gage | Nov. 8, 1927 |
| 2,894,366 | Leckie | July 14, 1959 |
| 2,913,197 | Fonden et al. | Nov. 17, 1959 |
| 2,957,657 | Frieder et al. | Oct. 25, 1960 |
| 2,977,074 | Cotton et al. | Mar. 28, 1961 |